US012562302B2

(12) United States Patent
Tai et al.

(10) Patent No.: US 12,562,302 B2
(45) Date of Patent: Feb. 24, 2026

(54) COPLANAR INDUCTOR

(71) Applicant: TMY Technology Inc., Taipei (TW)

(72) Inventors: Yang Tai, Hsinchu County (TW); Shun-Chung Kuo, Miaoli County (TW); Wen-Tsai Tsai, Hsinchu (TW); Jiun-Wei Wu, Taipei (TW); Yu-Lin Lee, Taipei (TW)

(73) Assignee: TMY Technology Inc., Taipei (TW)

( * ) Notice: Subject to any disclaimer, the term of this patent is extended or adjusted under 35 U.S.C. 154(b) by 868 days.

(21) Appl. No.: 17/477,540

(22) Filed: Sep. 17, 2021

(65) Prior Publication Data

US 2022/0157509 A1 May 19, 2022

Related U.S. Application Data

(60) Provisional application No. 63/115,570, filed on Nov. 18, 2020.

(30) Foreign Application Priority Data

Apr. 9, 2021 (TW) ................................ 110112829

(51) Int. Cl.
*H01F 27/28* (2006.01)

(52) U.S. Cl.
CPC .................................... *H01F 27/28* (2013.01)

(58) Field of Classification Search
CPC ............. H01F 27/28; H01F 2017/0073; H01F 17/0006; H01P 1/2039; H01Q 1/36; H01Q 3/00

(Continued)

(56) References Cited

U.S. PATENT DOCUMENTS 8,847,846 B1 9/2014 Diaz
9,024,840 B2 5/2015 Henderson et al.
(Continued)

FOREIGN PATENT DOCUMENTS

CN 111355025 6/2020
KR 20030013191 2/2003
(Continued)

OTHER PUBLICATIONS

H. Nakano et al., “A theoretical investigation of the two-wire round spiral antenna—Archimedian type, ” 1979 Antennas and Propagation Society International Symposium, Jun. 18-22, 1979, pp. 387-390.

(Continued)

*Primary Examiner* — Shawki S Ismail
*Assistant Examiner* — Kazi S Hossain
(74) *Attorney, Agent, or Firm* — JCIPRNET

(57) ABSTRACT

The disclosure provides a coplanar inductor, which includes a first spiral arm, a second spiral arm and a conductive patch. The first spiral arm has a first end and a second end, wherein the first spiral arm spirally extends from the first end of the first spiral arm toward the second end of the first spiral arm from inside to outside. The second spiral arm has a first end and a second end. The second spiral arm extends spirally from the first end of the second spiral arm toward the second end of the second spiral arm from inside to outside. The first end of the second spiral arm is coupled to the first end of the first spiral arm through the conductive patch, and the first spiral arm and the second spiral arm are coplanar.

9 Claims, 14 Drawing Sheets

(58) Field of Classification Search
USPC .......................................... 336/222, 200, 232
See application file for complete search history.

(56) References Cited

U.S. PATENT DOCUMENTS

| | | | | |
|---|---|---|---|---|
| 9,680,211 | B2 | 6/2017 | Kletsov et al. | |
| 10,381,719 | B2 | 8/2019 | Rahman et al. | |
| 2003/0137384 | A1* | 7/2003 | Itou | H05K 1/165 336/200 |
| 2006/0273418 | A1* | 12/2006 | Chung | H01L 23/5227 257/E27.005 |
| 2007/0045773 | A1* | 3/2007 | Mi | H01F 17/0006 336/200 |
| 2007/0120622 | A1* | 5/2007 | Ezzeddine | H01P 5/185 333/136 |
| 2007/0120637 | A1 | 5/2007 | Ezzeddine | |
| 2009/0066461 | A1* | 3/2009 | Ezzeddine | H01F 17/0013 336/200 |
| 2009/0085707 | A1* | 4/2009 | Mi | H01F 27/29 336/200 |
| 2019/0058449 | A1 | 2/2019 | Smith | |
| 2019/0096569 | A1* | 3/2019 | Tanabe | H01F 41/041 |

FOREIGN PATENT DOCUMENTS

| | | | |
|---|---|---|---|
| KR | 20030013191 | A * | 2/2003 |
| TW | I462126 | | 11/2014 |
| TW | 201837932 | | 10/2018 |

OTHER PUBLICATIONS

N.I. Dib et al., "Physical Modelling and Particle Swarm Design of Coplanar Waveguide Square Spiral Inductor," International Journal of Modelling and Simulation, Jan. 2008, pp. 219-225.

C. Patrick Yue et al., "Physical Modeling of Spiral Inductors on Silicon," IEEE Transactions On Electron Devices, vol. 47, No. 3, Mar. 2000, pp. 560-568.

Aymen Ammouri et al., "Experimental Analysis of Planar Spiral Inductors," 2014 International Conference on Electrical Sciences and Technologies in Maghreb (CISTEM), Nov. 3-6, 2014, pp. 1-5.

"Search Report of Europe Counterpart Application", issued on Dec. 14, 2021, pp. 1-9.

Babkovic Kalman et al., "Inductive Displacement Sensor of Novel Design Printed on Polyimide Foil", IEEE Transactions On Magnetics, vol. 53, Issue 4, Apr. 2017, pp. 1-5.

Wadell Brian C, "Transmission Line Design Handbook" , Artech House, Jan. 1991, pp. 379-412.

Dell J M et al., "Variable mems-based inductors fabricated from pecvd silicon nitride", Optoelectronic and Microelectronic Materials and Devices, 2002 Confere nce On Dec. 11-13, 2002, Piscataway, NJ, USA,IEEE, Dec. 11, 2002, pp. 567-570.

"Office Action of Europe Counterpart Application", issued on Jan. 12, 2023, p. 1-p. 13.

* cited by examiner

COPLANAR INDUCTOR

CROSS-REFERENCE TO RELATED APPLICATION

This application claims the priority benefit of U.S. application Ser. No. 63/115,570, filed on Nov. 18, 2020, and Taiwan application Ser. No. 110112829, filed on Apr. 9, 2021. The entirety of each of the above-mentioned patent applications is hereby incorporated by reference herein and made a part of this specification.

BACKGROUND

Technical Field

The disclosure relates to an inductor structure, and particularly relates to a coplanar inductor.

Description of Related Art

Generally speaking, spiral inductors are more commonly used in integrated design of printed circuit board (printed circuit board, PCB) or IC design. Compared with conventional inductors, spiral inductors are less affected by parasitic effects in high-frequency characteristics, and planar design can be adopted to simplify circuit design and reduce the influence caused by welding and human factors.

Please refer to FIG. 1, FIG. 1 is a schematic view of a conventional spiral inductor. As can be seen from FIG. 1, the spiral inductor 100 has a first end 100*a* and a second end 100*b*, and the first end 100*a* can be regarded as being located in the middle of the spiral inductor 100. When the first end 100*a* serves as the input end of the spiral inductor 100, if a signal is to be fed into the spiral inductor 100 from the first end 100*a*, the signal can only be fed to the spiral inductor 100 through an additional via hole. In other words, the signal cannot be fed to the first end 100*a* in a coplanar manner. In this case, it is more difficult for the spiral inductor 100 to be combined with other circuit structures, and the overall size will be relatively large.

SUMMARY

In view of the above technical problem, the disclosure provides a coplanar inductor, which can be used to solve the above technical problems.

The disclosure provides a coplanar inductor, which includes a first spiral arm, a second spiral arm and a conductive patch. The first spiral arm has a first end connected to the conductive patch and a second end, wherein the first spiral arm spirally extends from the first end of the first spiral arm toward the second end of the first spiral arm from the inside to the outside. The second spiral arm has a first end connected to the conductive patch and a second end, wherein the second spiral arm extends spirally from the first end of the second spiral arm toward the second end of the second spiral arm from the inside to the outside. The first spiral arm and the second spiral arm are coplanar, and the coplanar inductor is physically connected to at least one external circuit only via the second end of the first spiral arm and the second end of the second spiral arm

DESCRIPTION OF THE EMBODIMENTS

Figure 2A:
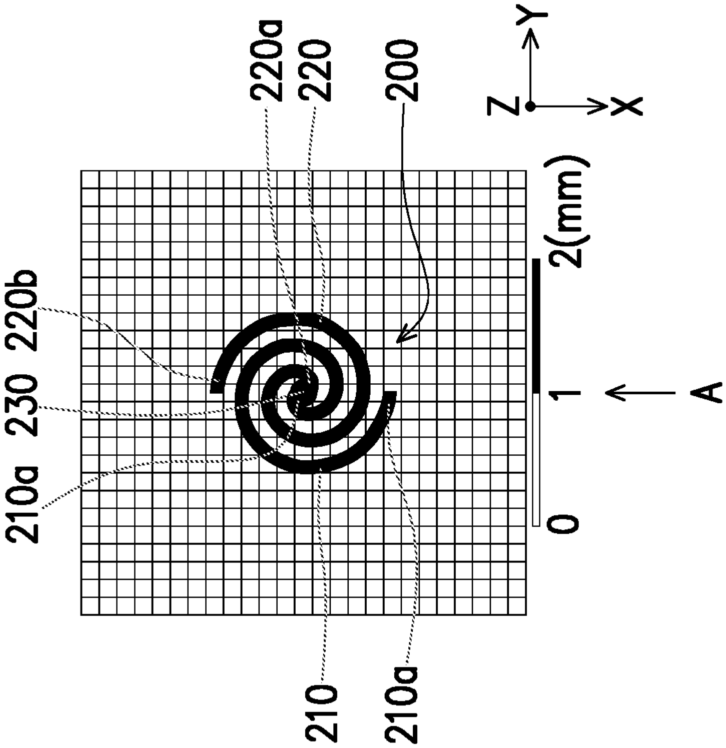
FIG. 2A is a schematic view illustrating a coplanar inductor according to an embodiment of the disclosure.
Figure 2B:
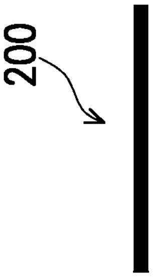
FIG. 2B is a side view of the coplanar circuit viewed from a viewing angle A.
Figure 1:
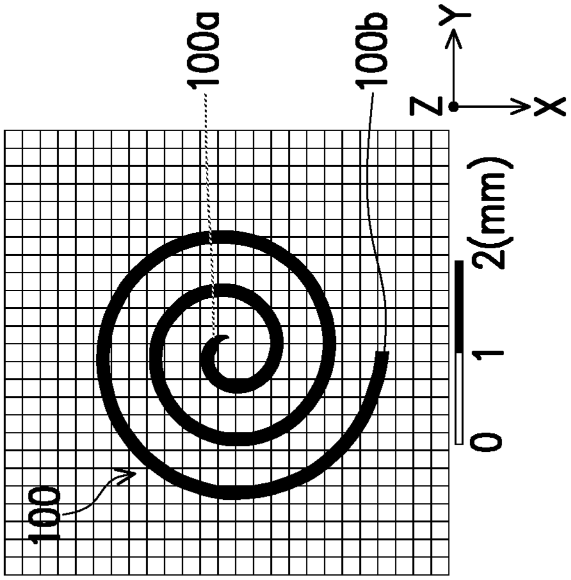
FIG. 1 is a schematic view of a conventional spiral inductor.

Please refer to FIG. 2A and FIG. 2B, FIG. 2A is a top view illustrating a coplanar inductor according to an embodiment of the disclosure, and FIG. 2B is a side view of a coplanar circuit viewed from a viewing angle A. As shown in FIG. 2A, the coplanar inductor 200 of the disclosure includes a first spiral arm 210, a second spiral arm 220 and a conductive patch 230. Moreover, it can be seen from FIG. 2B that the first spiral arm 210, the second spiral arm 220, and the conductive patch 230 are located on the same plane. It should be noted that, in each of the following embodiments, the first spiral arm and the second spiral arm are both conductive, and, preferably, made of the same conductive material as the conductive patch.

In the embodiment of the disclosure, the first spiral arm 210 has a first end 210*a* connected to the conductive patch 230 and a second end 210*b*, wherein the first spiral arm 210 spirally extends from the first end 210*a* of the first spiral arm 210 toward the second end 210*b* of the first spiral arm 210 from the inside to the outside.

The second spiral arm 220 has a first end 220*a* connected to the conductive patch 230 and a second end 220*b*, wherein the second spiral arm 220 spirally extends from the first end 220*a* of the second spiral arm 220 toward the second end 220*b* of the second spiral arm 220 from the inside to the outside.

In the embodiment of the disclosure, the conductive patch 230 is, for example, a circular patch, and may be located in the middle of the coplanar inductor 200. Under the circumstances, the first end 220*a* of the second spiral arm 220 can be coupled to the first end 210*a* of the first spiral arm 210 through the conductive patch 230. In addition, the first spiral arm 210 and the second spiral arm 220 are coplanar.

In an embodiment, one of the second end 210*b* of the first spiral arm 210 and the second end 220*b* of the second spiral arm 220 may be the input end of the coplanar inductor 200, and the second end 210*b* of the first spiral arm 210 and the other of the second end 220*b* of the second spiral arm 220 may be the output end of the coplanar inductor 200.

For example, the second end 210*b* of the first spiral arm 210 and the second end 220*b* of the second spiral arm 220 can serve as the input end and the output end of the coplanar inductor 200, respectively. Under the circumstances, when the second end 210*b* of the first spiral arm 210 receives the feeding signal, the first spiral arm 210 can transmit the feeding signal to the second spiral arm 220 through the conductive patch 230, so that the first spiral arm 210 and the second spiral arm 220 can serve as a resonant body. In this way, the coplanar inductor 200 can be effectively operated in a higher frequency band.

In addition, since the feeding signal can be fed into the coplanar inductor 200 in a coplanar manner, the size of the coplanar inductor 200 can be reduced, while maintaining miniaturization and broadband response characteristics. Moreover, when the first spiral arm 210 and the second spiral arm 220 are coplanar, the coplanar inductor 200 can be easily combined with other circuit architectures without additional matching circuits, so it is suitable for being adopted in the fifth generation (5G) communication systems and millimeter wave circuits and other architectures.

In some embodiments, the coplanar inductor 200 is physically connected to at least one external circuit (e.g., 5G communication circuits) only via the second end 210*b* of the first spiral arm 210 and the second end 220*b* of the second spiral arm 220. In this case, the conductive patch 230 is only connected to the first end 210*a* of the first spiral arm 210 and the first end 220*a* of the second spiral arm 220.

In other embodiments, the second end 210*b* of the first spiral arm 210 and the second end 220*b* of the second spiral arm 220 can also serve as the output end and the input end of the coplanar inductor 200, respectively, and achieve the technical effects as described above, no further description will be incorporated herein.

As shown in FIG. 2A, the first spiral arm 210 and the second spiral arm 220 may both be Archimedean spirals. In other embodiments, one of the first spiral arm 210 and the second spiral arm 220 may be an Archimedes spiral, but may not be limited thereto.

In FIG. 2A, the polar coordinate equation of the first spiral arm 210 can be characterized as $r_1(\theta)=a+b\theta$, and the polar coordinate equation of the second spiral arm 220 can be characterized as $r_2(\theta+\Delta)=a+b(\theta+\Delta)$, wherein a and b are constants, Δ is used to characterize the angle difference between the first spiral arm 210 and the second spiral arm 220, wherein a, b, θ, and Δ are all real numbers. In the scenario of FIG. 2A, the angle difference between the first spiral arm 210 and the second spiral arm 220 can be regarded as 180 degrees, but in other embodiments, the angle difference between the first spiral arm 210 and the second spiral arm 220 can be any value between 90 degrees and 270 degrees.

Figure 3:
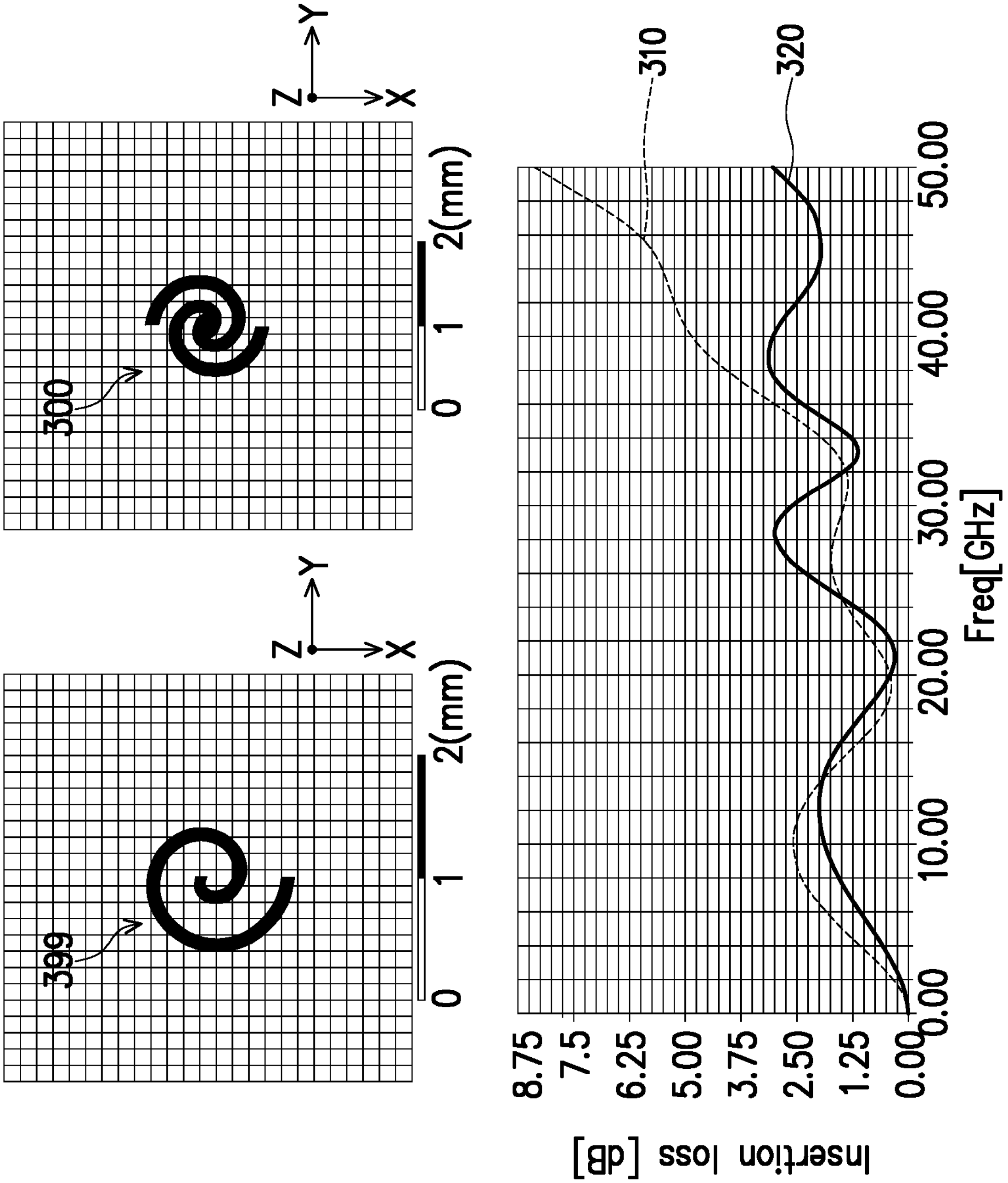
FIG. 3 is a comparison diagram of a conventional spiral inductor and a coplanar inductor according to an embodiment of the disclosure.

Please refer to FIG. 3, which is a comparison diagram of a conventional spiral arm and a coplanar inductor according to an embodiment of the disclosure. In the scenario of FIG. 3 (and FIG. 4B, FIG. 5B, FIG. 6B, and FIG. 7B), the simulated environment/parameters used include, for example: (1) a high frequency printed circuit board (PCB) (model RO4350C) is adopted, its relative dielectric coefficient and thickness are 3.66 and 20 mil (i.e., 0.508 mm) respectively; (2) the thickness of copper is 1 OZ (35 microns); (3) the line width and the radius of center patch are both 0.15 mm. In addition, in FIG. 3, the coplanar inductor 300 of the disclosure may have the same length as the conventional spiral arm 399, for example. In addition, in the insertion loss diagram in the lower half of FIG. 3, the curves 310 and 320 correspond to the spiral arm 399 and the coplanar inductor 300 respectively.

It can be seen from the lower part of FIG. 3 that in a frequency band with relatively high frequency (for example, above 40 GHz), the coplanar inductor 300 of the disclosure has a lower insertion loss than the spiral arm 399. In addition, since the frequency bands with insertion loss below 3 dB are in the operable range, it can be obtained that the coplanar inductor 300 of the disclosure can have a larger bandwidth than the spiral arm 399. In addition, the disclosure can also correspondingly adjust the bandwidth according to the requirements of the matched circuit structure, so as to achieve the purpose of integration with the circuit structure.

In different embodiments, the coplanar inductor of the disclosure can be adjusted to different coil turns/sizes according to the needs of the designer.

Figure 4A:
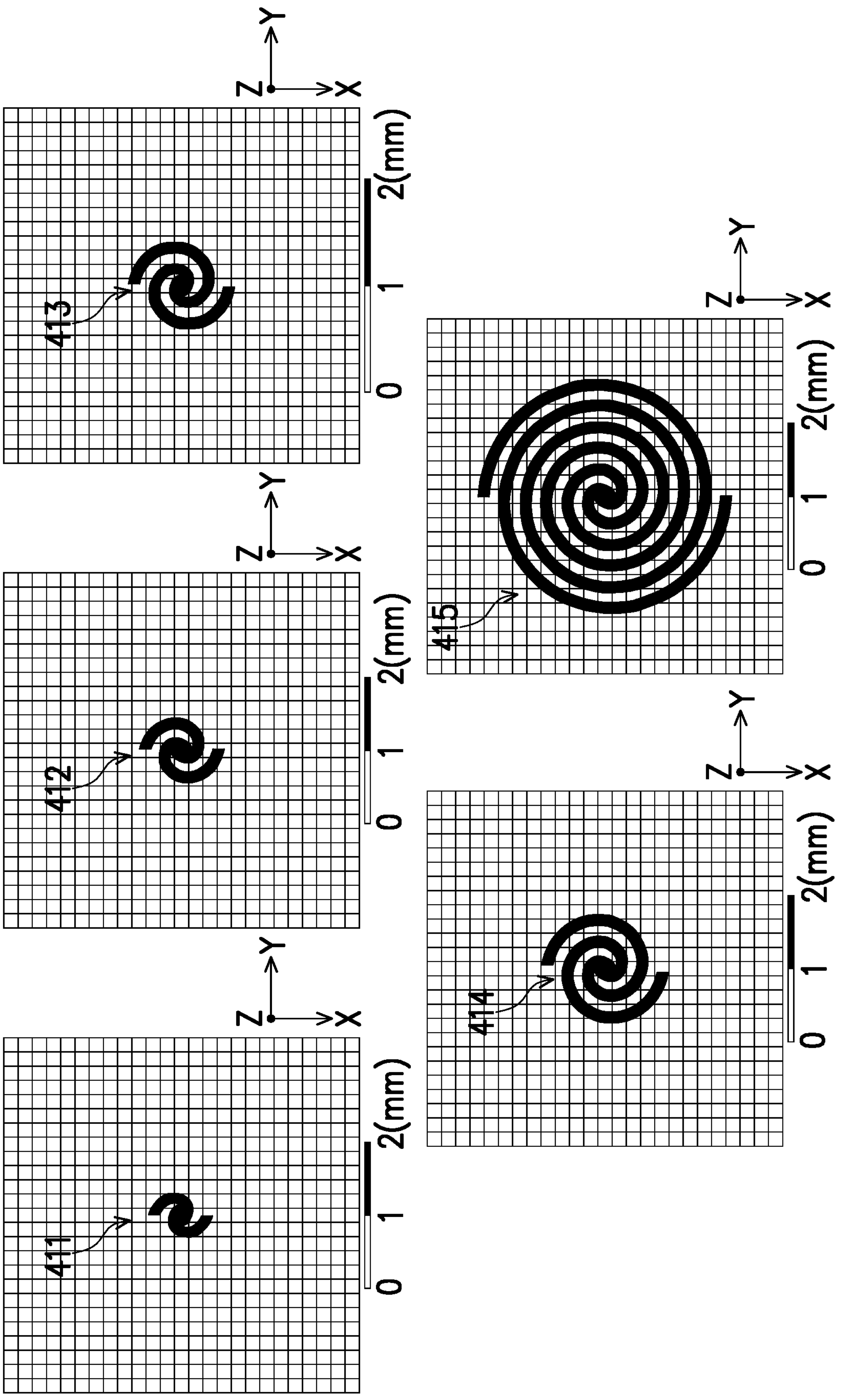
FIG. 4A is a schematic view of coplanar inductors with different numbers of coil turns according to different embodiments of the disclosure.

Please refer to FIG. 4A, which is a schematic view of coplanar inductors with different numbers of coil turns according to different embodiments of the disclosure. In FIG. 4A, the first and second spiral arms of the coplanar inductors 411 to 415 of the disclosure can all be Archimedes spirals, and thus can be described by using the polar coordinate equation mentioned above.

Under the circumstances, the coplanar inductances 411 to 415 can be regarded as corresponding to the same values of a, b, and Δ, but the corresponding range θ is different. For example, the range θ corresponding to the coplanar inductor 411 is about 0 degrees to 180 degrees; the range θ corresponding to the coplanar inductor 412 is about 0 degrees to 360 degrees; the range θ corresponding to the coplanar inductor 413 is about 0 degrees to 540 degrees; the range θ corresponding to the coplanar inductor 414 is about 0 degrees to 720 degrees; the range θ corresponding to the coplanar inductor 415 is about 0 degrees to 900 degrees, but the disclosure is not limited thereto. Generally speaking, the larger the range θ, the lower the operable frequency of the coplanar inductor, the designer can select an appropriate range θ according to requirements.

Figure 4B:
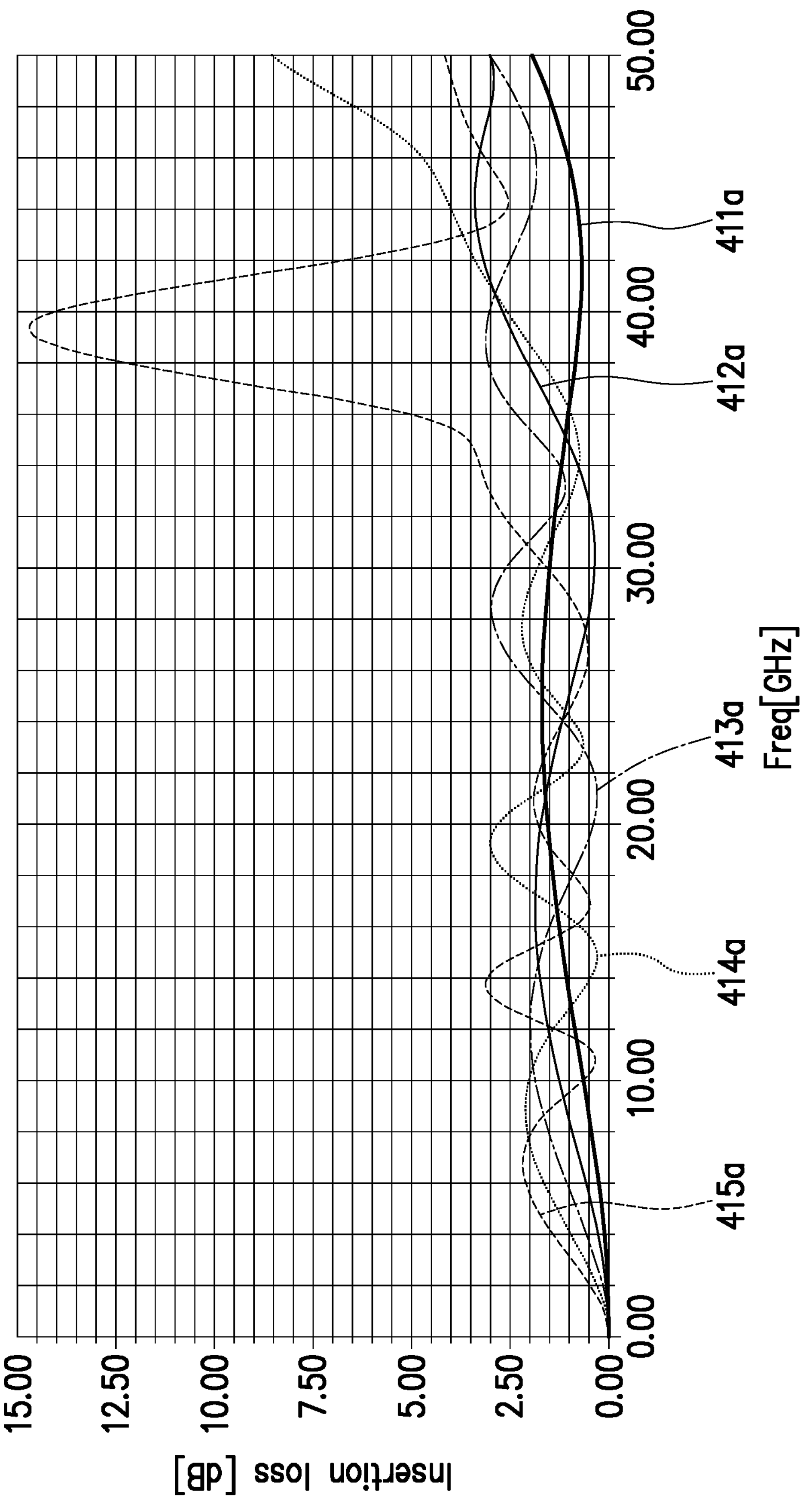
FIG. 4B is a graph of insertion loss of various coplanar inductors in FIG. 4A.

Please refer to FIG. 4B, which is a graph of insertion loss of various coplanar inductors in FIG. 4A. In FIG. 4B, the curves 411*a* to 415*a* may correspond to the coplanar inductors 411 to 415, respectively. It can be seen from FIG. 4B that the coplanar inductors 411 to 415 of the disclosure can operate at 40 GHz, and are therefore suitable for being adopted in millimeter wave circuits.

In other embodiments, the first and second spiral arms in the coplanar inductor of the disclosure can also be implemented in a manner other than the Archimedes spiral.

Figure 5A:
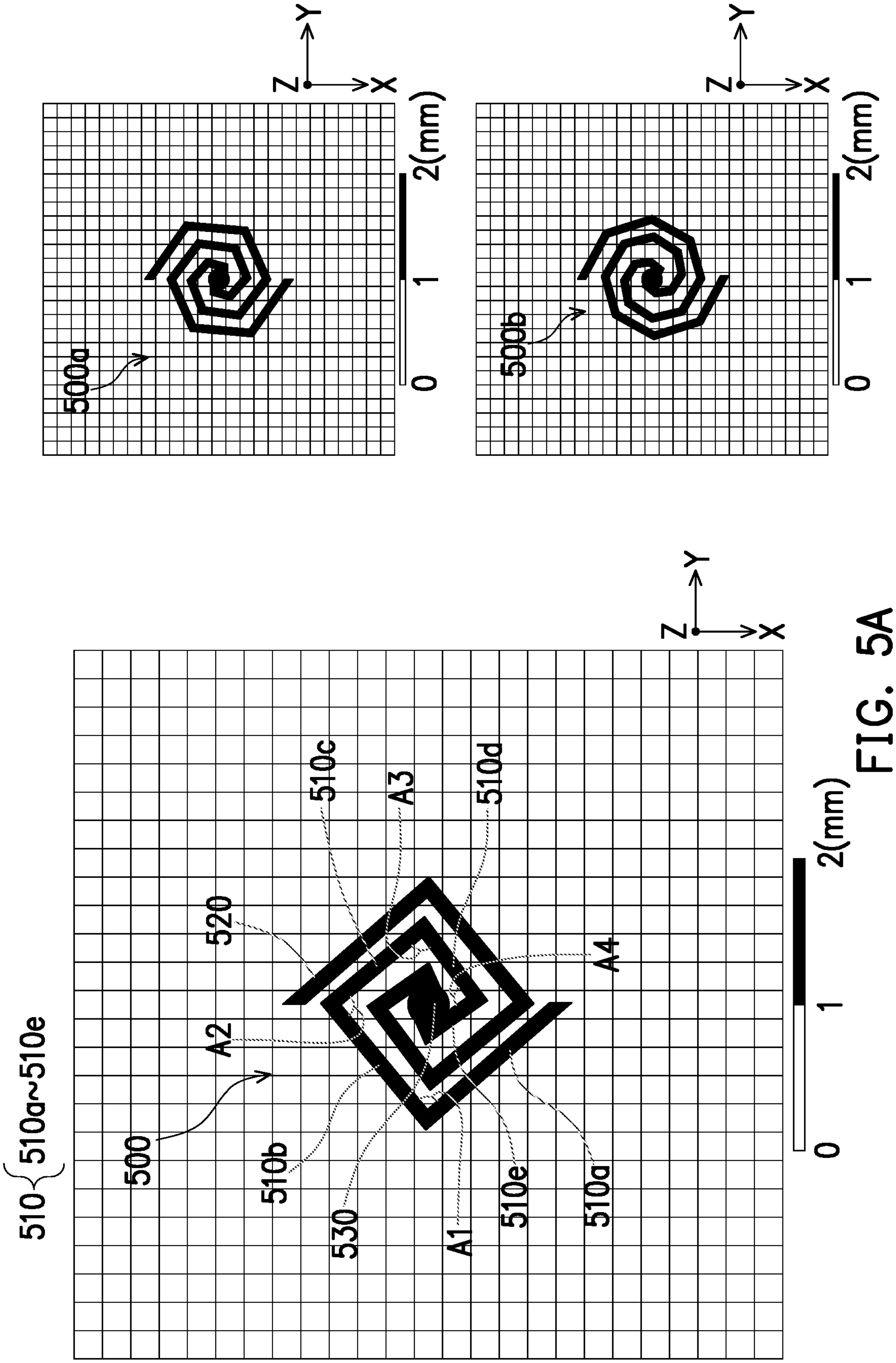
FIG. 5A is a schematic view illustrating a plurality of coplanar inductors according to different embodiments of the disclosure.

Please refer to FIG. 5A, which is a schematic view of a plurality of coplanar inductors according to different embodiments of the disclosure. In FIG. 5A, the coplanar inductor 500 may include a first spiral arm 510, a second spiral arm 520, and a conductive patch 530. The first spiral arm 510 can be coupled to the second spiral arm 520 through the conductive patch 530.

In the embodiment of the disclosure, the first spiral arm 510 has a first end connected to the conductive patch 530 and a second end, wherein the first spiral arm 510 spirally extends from the first end of the first spiral arm 510 toward the second end of the first spiral arm 510 from the inside to the outside.

The second spiral arm 520 has a first end connected to the conductive patch 530 and a second end, wherein the second spiral arm 520 spirally extends from the first end of the second spiral arm 520 toward the second end of the second spiral arm 520 from the inside to the outside.

In the embodiment of the disclosure, the conductive patch 530 is, for example, a circular patch, and may be located in the middle of the coplanar inductor 500. Under the circumstances, the first end of the second spiral arm 520 can be coupled to the first end of the first spiral arm 510 through the conductive patch 530. In addition, the first spiral arm 510 and the second spiral arm 520 are coplanar.

In some embodiments, the coplanar inductor 500 is physically connected to at least one external circuit (e.g., 5G communication circuits) only via the second end of the first spiral arm 510 and the second end of the second spiral arm 520. In this case, the conductive patch 530 is only connected to the first end of the first spiral arm 510 and the first end of the second spiral arm 520.

As shown in FIG. 5A, the first spiral arm 510 may include a plurality of line segments 510*a* to 510*e* connected in series, wherein an included angle is formed between adjacent line segments among the line segments 510*a* to 510*e*, and the included angle may be greater than 90 degrees and less than 180 degrees. For example, an included angle A1 is formed between adjacent line segments 510*a* and 510*b*; an included angle A2 is formed between adjacent line segments 510*b* and 510*c*; an included angle A3 is formed between adjacent line segments 510*c* and 510*d*; and an included angle A4 is formed between adjacent line segments 510*d* and 510*e*. In addition, the included angles A1 to A4 may have the same value, but may not be limited thereto.

In FIG. 5A, the second spiral arm 520 may have the same structure as the first spiral arm 510. In other words, the second spiral arm 520 may also include a plurality of line segments connected in series, and the related details of each line segment can be derived from the related description of the first spiral arm 510, so no further description is incorporated herein.

Figure 5B:
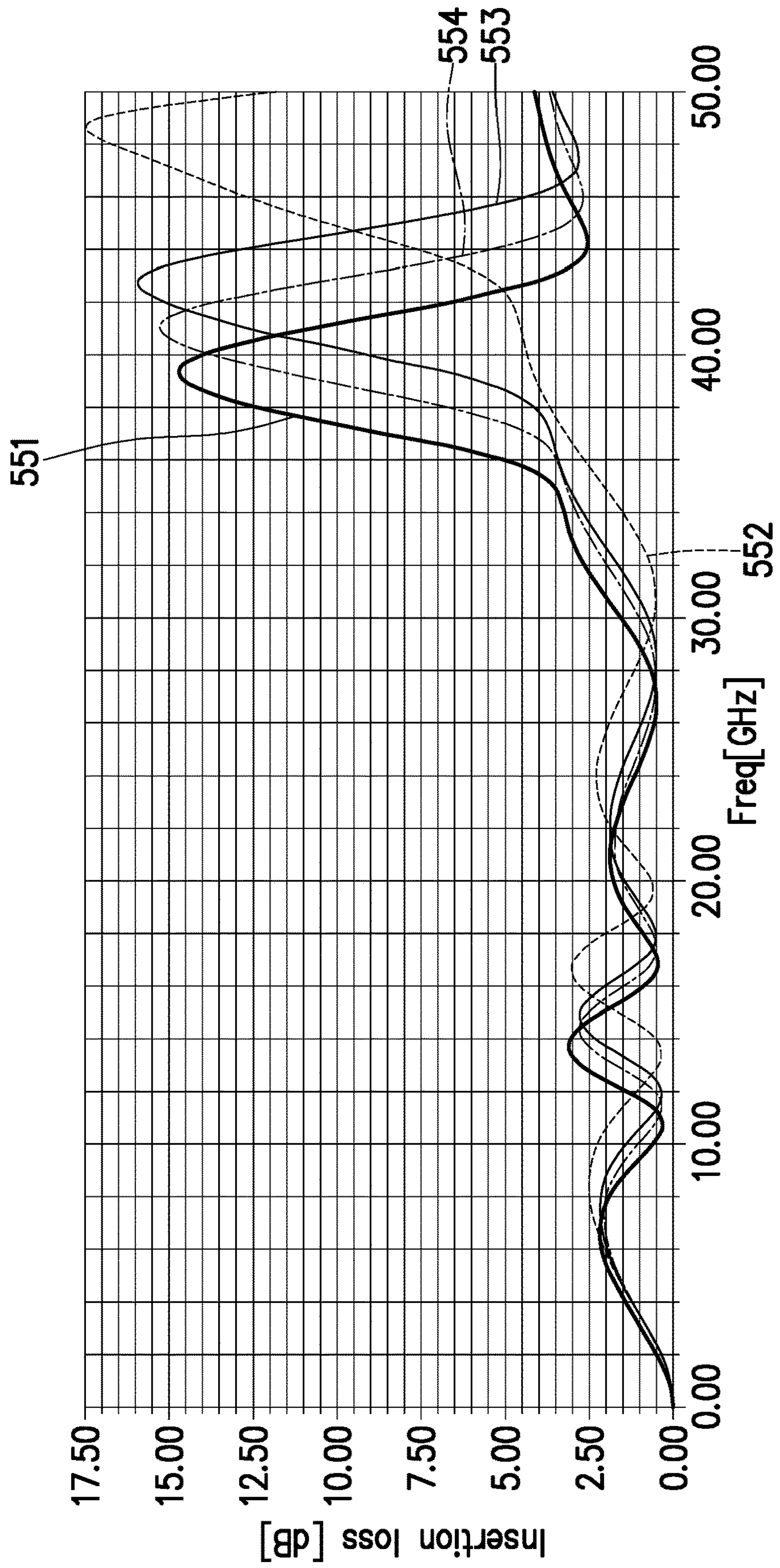
FIG. 5B is a graph of insertion loss of the coplanar inductors shown in FIG. 5A.

Based on the similarity principle, the first and second spiral arms (not shown) in the coplanar inductor 500*a* can also individually include multiple line segments connected in series, but the value of the angle between the two adjacent line segments among the line segments can be slightly larger than the included angles A1 to A4, but the disclosure is not limited thereto. In addition, the first and second spiral arms (not shown) in the coplanar inductor 500*b* can individually include multiple line segments connected in series, but the value of the angle between the two adjacent line segments among the line segments can be slightly larger than the various angles in the coplanar inductor 500*a*, but the disclosure is not limited thereto. In other words, the first spiral arm and the second spiral arm in the embodiments of FIG. 5A can be spirangle. Please refer to FIG. 5B, which is a graph of insertion loss of the coplanar inductor shown in FIG. 5A. In FIG. 5B, curves 551 to 554 may correspond to coplanar inductors 200, 500, 500*a*, and 500*b*, respectively. It can be seen from FIG. 5B that when the number of coil turns is approximately the same, the coplanar inductors 200, 500, 500*a*, and 500*b* of the disclosure have approximately the same operating bandwidth. In other words, the value of angle between the line segments has no significant impact on the operating bandwidth.

Figure 6A:
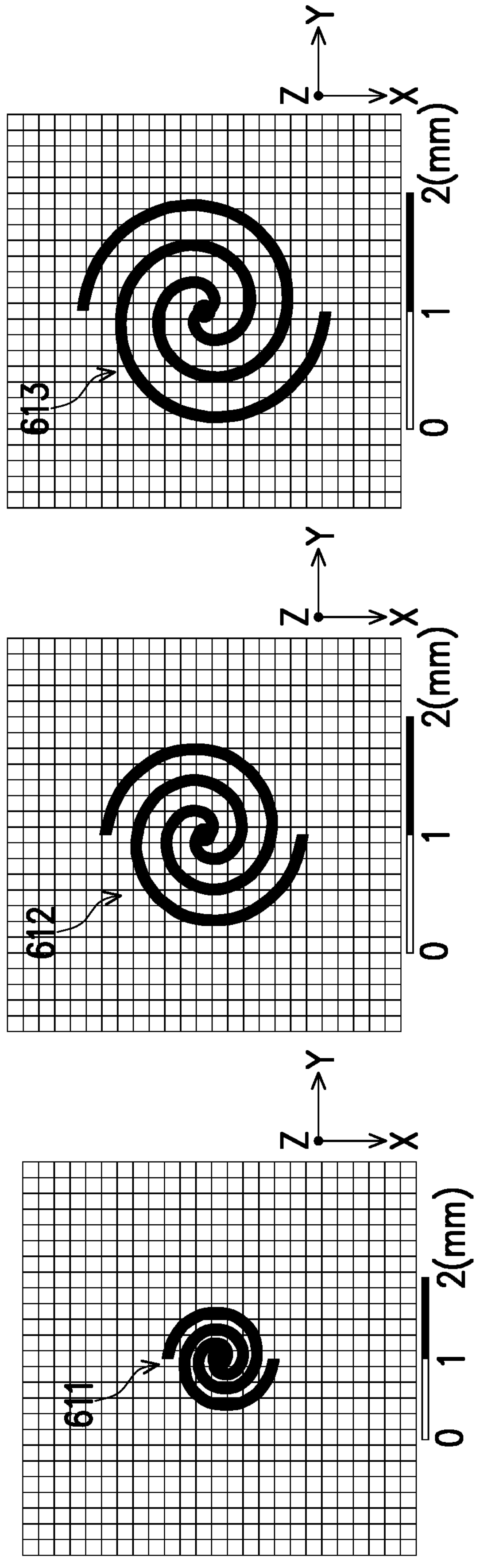
FIG. 6A is a schematic view illustrating a plurality of coplanar inductors according to different embodiments of the disclosure.

Please refer to FIG. 6A, which is a schematic view of a plurality of coplanar inductors according to different embodiments of the disclosure. In FIG. 6A, the first and second spiral arms of the coplanar inductors 611 to 613 can all be Archimedes spirals, and therefore can be described by the polar coordinate equation mentioned above.

In this embodiment, the coplanar inductors 611 to 613 and the coplanar inductor 200 of FIG. 2A may correspond to the same value a, value Δ, and range θ, but correspond to different values b. For example, the value b corresponding to the coplanar inductance 200 is, for instance, 0.3/π, the value b corresponding to the coplanar inductor 611 is, for instance, 0.2/π, the value b corresponding to the coplanar inductor 612 is, for instance, 0.4/π, and the value b corresponding to the coplanar inductor 613 is, for instance, 0.5/π, but the disclosure is not limited thereto.

Figure 6B:
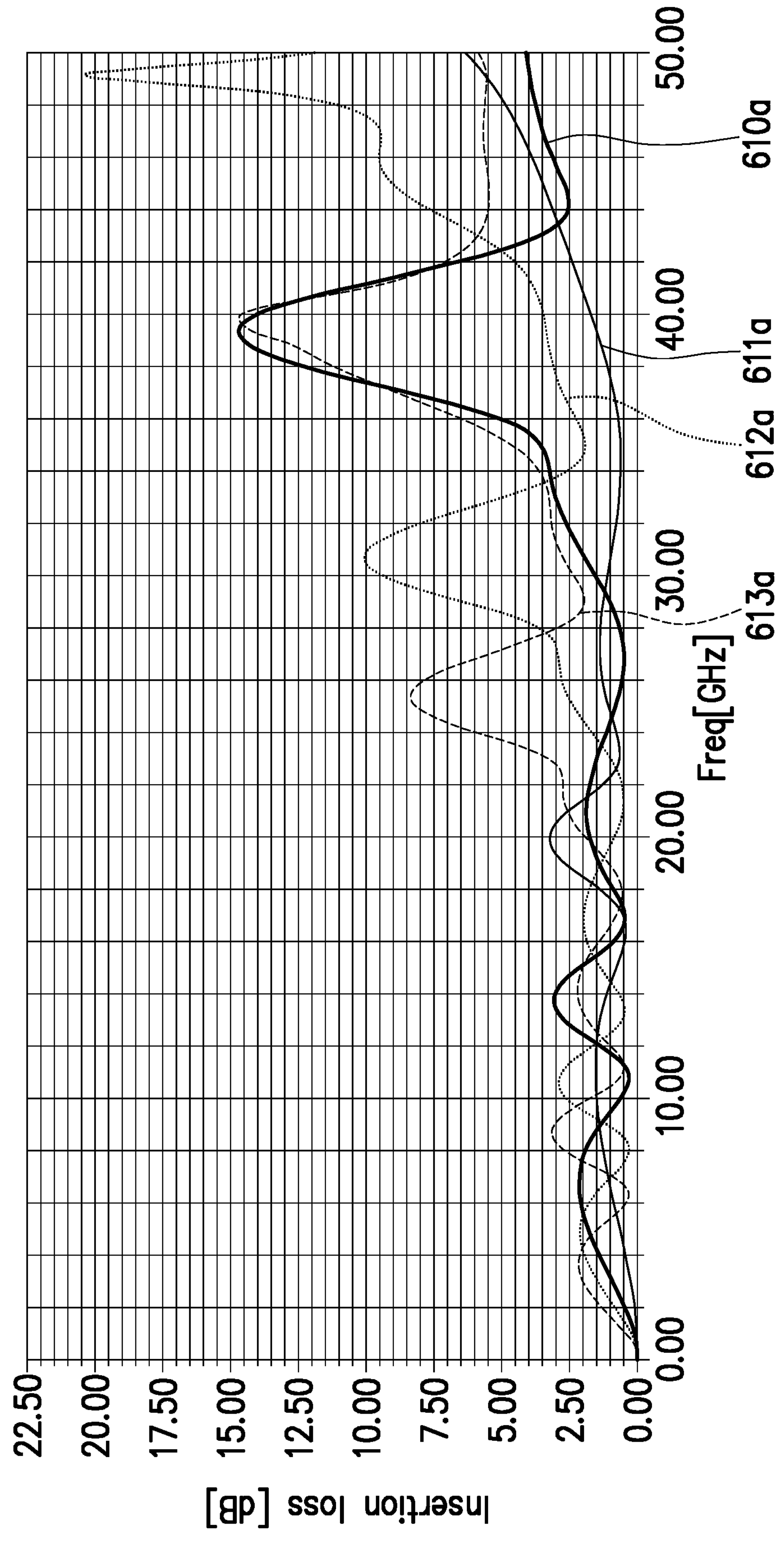
FIG. 6B is a graph of insertion loss of the coplanar inductors shown in FIG. 6A.

Please refer to FIG. 6B, which is a graph of insertion loss of the coplanar inductors shown in FIG. 6A. In FIG. B, curves 610*a* to 613*a* may correspond to coplanar inductors 200 and 611 to 613, respectively. It can be seen from FIG. 6B that when the value a, the value Δ and the range θ are the same, the larger the value b, the lower the operable bandwidth.

Figure 7A:
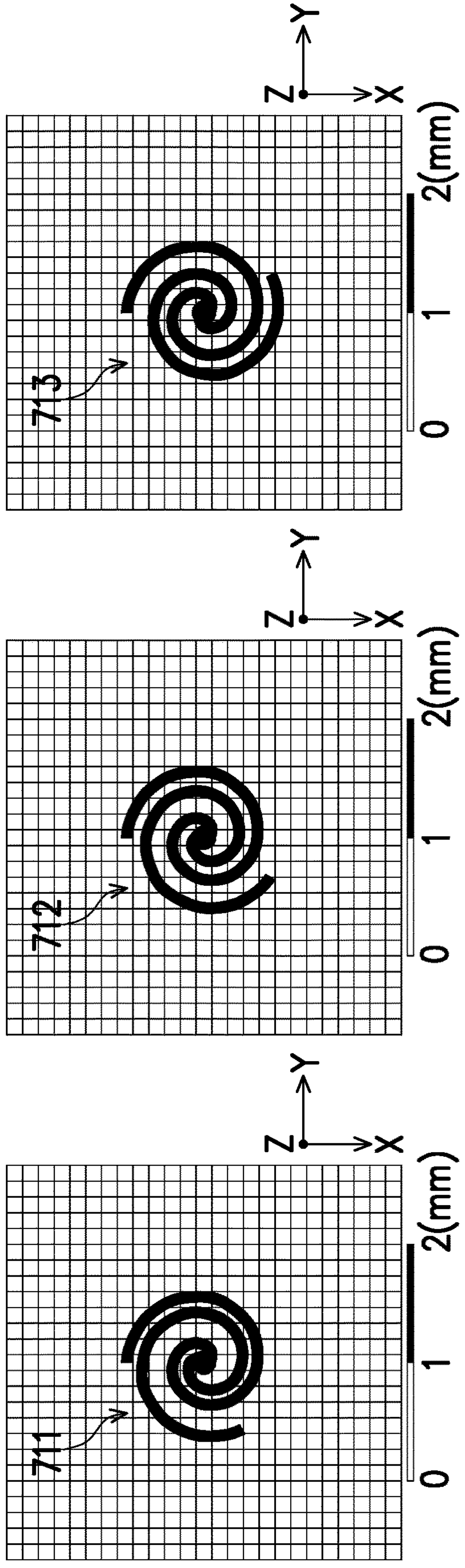
FIG. 7A is a schematic view illustrating a plurality of coplanar inductors according to different embodiments of the disclosure.

Please refer to FIG. 7A, which is a schematic view of a plurality of coplanar inductors according to different embodiments of the disclosure. In FIG. 7A, the first and second spiral arms of the coplanar inductors 711 to 713 can all be Archimedes spirals, and therefore can be described by the polar coordinate equation described above.

In this embodiment, the coplanar inductors 711 to 713 and the coplanar inductor 200 of FIG. 2A may correspond to the same value a, value b, and range θ, but correspond to different values Δ.

Roughly speaking, the value Δ corresponding to the coplanar inductor 200 can make the first and second spiral arms to differ by 180 degrees. Under the circumstances, the value Δ corresponding to the coplanar inductor 711 can make the first and second spiral arms to differ by 120 degrees; the value Δ corresponding to the coplanar inductor 712 can make the first and second spiral arms to differ by 150 degrees; the value Δ corresponding to the coplanar inductor 713 can make the first and second spiral arms to differ by 210 degrees, but the disclosure is not limited thereto.

Figure 7B:
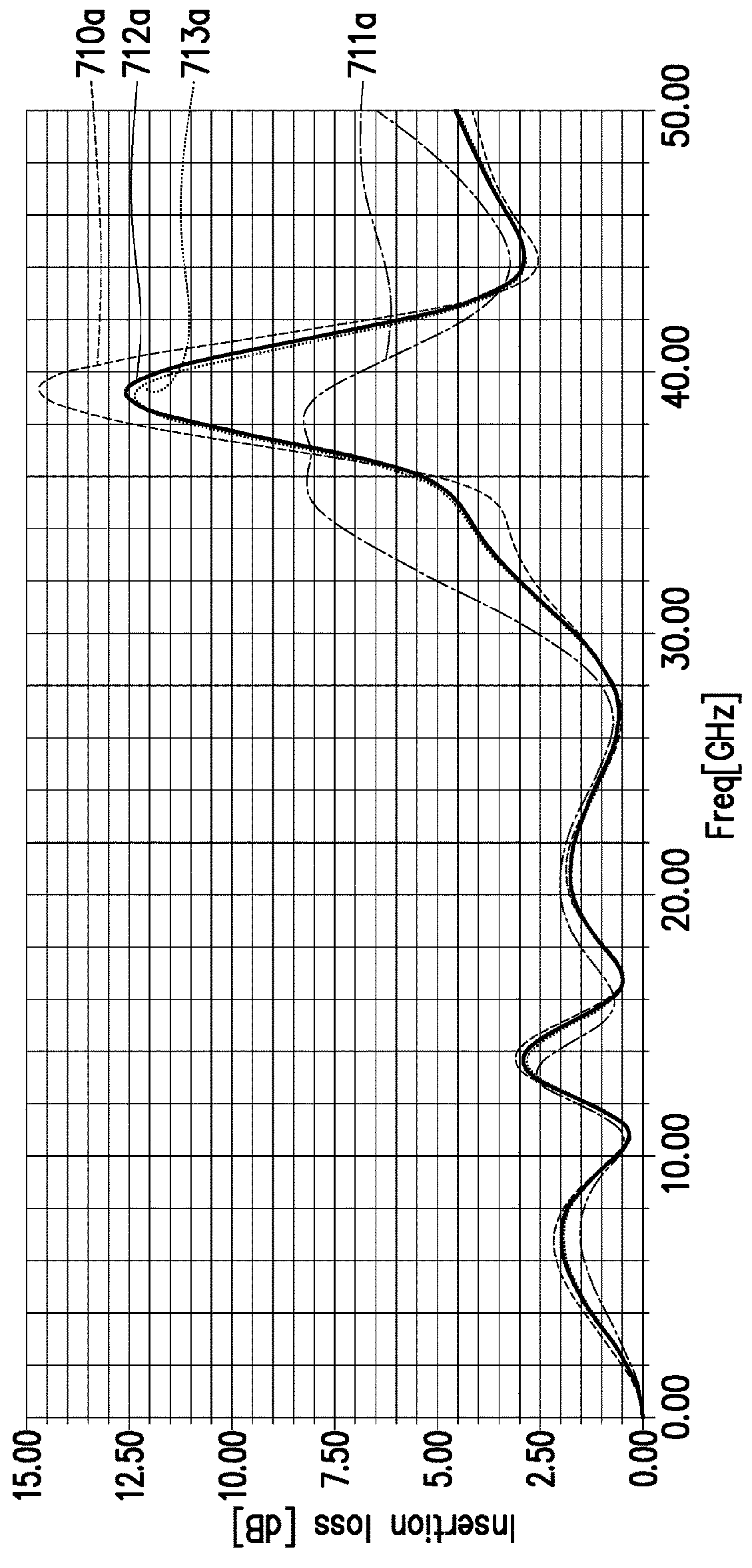
FIG. 7B is a graph of insertion loss of the coplanar inductors shown in FIG. 7A.

Please refer to FIG. 7B, which is a graph of insertion loss of the coplanar inductors shown in FIG. 7A. In FIG. 7B, curves 710*a* to 713*a* may correspond to coplanar inductors 200 and 711 to 713, respectively. It can be seen from FIG. 7B that when the angle between the first and second spiral arms is between 150 degrees and 240 degrees, the coplanar inductors will have similar characteristics.

Figure 8A:
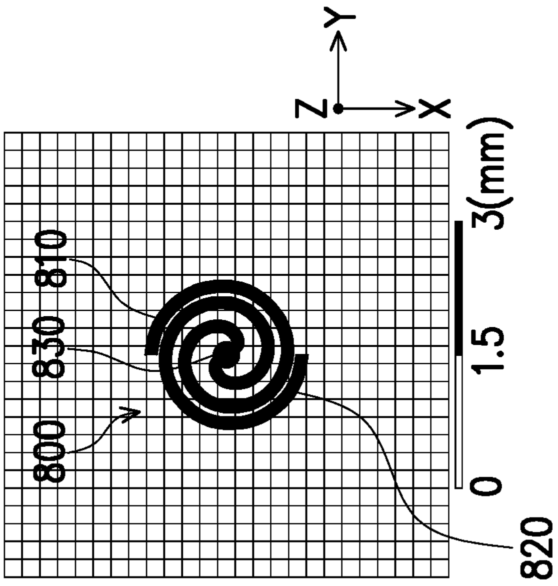
FIG. 8A is a schematic view illustrating a coplanar inductor according to an embodiment of the disclosure.

Please refer to FIG. 8A, which is a schematic view of a coplanar inductor according to an embodiment of the disclosure. In FIG. 8A, the coplanar inductor 800 can include a first spiral arm 810, a second spiral arm 820, and a conductive patch 830. The first spiral arm 810 can be coupled to the second spiral arm 820 through the conductive patch 830.

In the embodiment of the disclosure, the first spiral arm 810 has a first end connected to the conductive patch 830 and a second end, wherein the first spiral arm 810 spirally extends from the first end of the first spiral arm 810 toward the second end of the first spiral arm 810 from the inside to the outside.

The second spiral arm 820 has a first end connected to the conductive patch 830 and a second end, wherein the second spiral arm 820 spirally extends from the first end of the second spiral arm 820 toward the second end of the second spiral arm 820 from the inside to the outside.

In the embodiment of the disclosure, the conductive patch 830 is, for example, a circular patch, and may be located in the middle of the coplanar inductor 800. Under the circumstances, the first end of the second spiral arm 820 can be coupled to the first end of the first spiral arm 810 through the conductive patch 830. In addition, the first spiral arm 810 and the second spiral arm 820 are coplanar.

In some embodiments, the coplanar inductor 800 is physically connected to at least one external circuit (e.g., 8G communication circuits) only via the second end of the first spiral arm 810 and the second end of the second spiral arm 820. In this case, the conductive patch 830 is only connected to the first end of the first spiral arm 810 and the first end of the second spiral arm 820.

In FIG. 8A, the first spiral arm 810 and the second spiral arm 820 can both be Fermat's spirals, and they can also be described by using corresponding polar coordinate equations.

In this embodiment, the polar coordinate equation of the first spiral arm 810 can be characterized as $r_3^2(\theta)=a^2\theta$, and the polar coordinate equation of the second spiral arm 820 can be characterized as $r_4^2(\theta)=a^2(\theta+\Delta)$, wherein a and b are constants, and $\Delta$ is used to characterize the angle difference between the first spiral arm 810 and the second spiral arm 820, wherein a, $\theta$, and $\Delta$ are all real numbers. In the scenario of FIG. 8A, the angle difference between the first spiral arm 810 and the second spiral arm 820 can be understood as 180 degrees, but in other embodiments, the angle difference between the first spiral arm 810 and the second spiral arm 820 can be adjusted to other values according to the designer's needs.

Figure 8B:
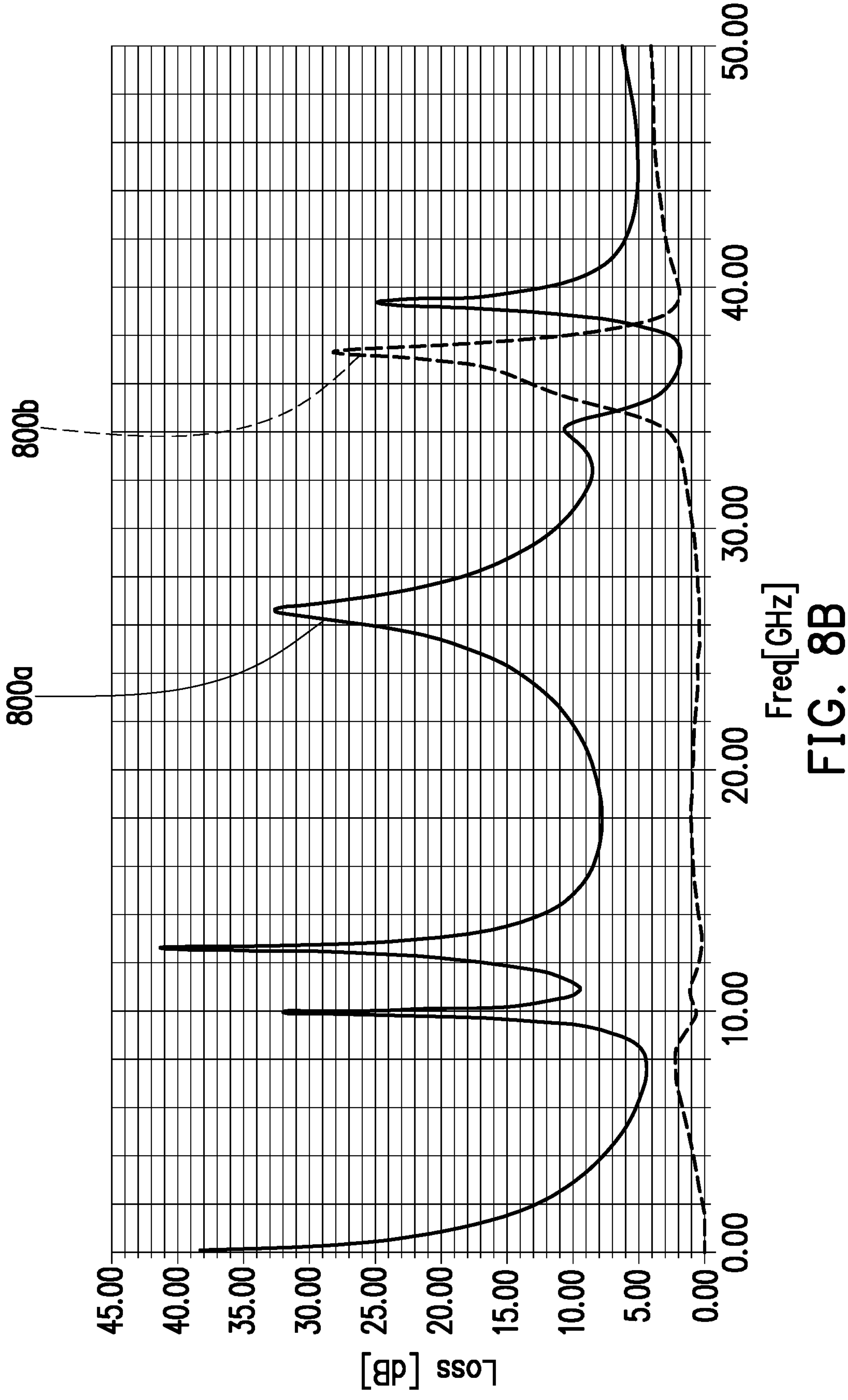
FIG. 8B is a graph of return loss and insertion loss of the coplanar inductor shown in FIG. 8A.

Please refer to FIG. 8B, which is a graph of return loss and insertion loss of the coplanar inductor shown in FIG. 8A. In FIG. 8B, curves 800*a* and 800*b* may be the return loss graph and the insertion loss graph of the coplanar inductor 800, respectively. Since the frequency bands where the insertion loss is below 3 dB are in the operable range, it can be seen that the coplanar inductor 800 of the disclosure can have a larger bandwidth. In addition, the disclosure can also correspondingly adjust the bandwidth according to the requirements of the matched circuit structure, so as to achieve the purpose of integration with the circuit structure.

Figure 9A:
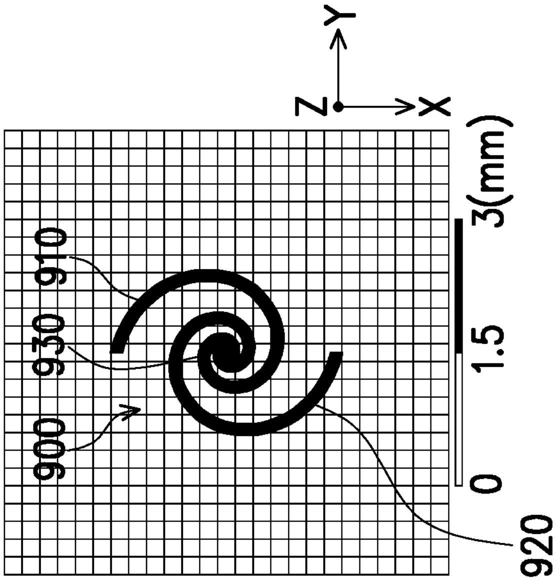
FIG. 9A is a schematic view of a coplanar inductor according to an embodiment of the disclosure.

Please refer to FIG. 9A, which is a schematic view of a coplanar inductor according to an embodiment of the disclosure. In FIG. 9A, the coplanar inductor 900 may include a first spiral arm 910, a second spiral arm 920, and a conductive patch 930. The first spiral arm 910 can be coupled to the second spiral arm 920 through the conductive patch 930.

In the embodiment of the disclosure, the first spiral arm 910 has a first end connected to the conductive patch 930 and a second end, wherein the first spiral arm 910 spirally extends from the first end of the first spiral arm 910 toward the second end of the first spiral arm 910 from the inside to the outside.

The second spiral arm 920 has a first end connected to the conductive patch 930 and a second end, wherein the second spiral arm 920 spirally extends from the first end of the second spiral arm 920 toward the second end of the second spiral arm 920 from the inside to the outside.

In the embodiment of the disclosure, the conductive patch 930 is, for example, a circular patch, and may be located in the middle of the coplanar inductor 900. Under the circumstances, the first end of the second spiral arm 920 can be coupled to the first end of the first spiral arm 910 through the conductive patch 930. In addition, the first spiral arm 910 and the second spiral arm 920 are coplanar.

In some embodiments, the coplanar inductor 900 is physically connected to at least one external circuit (e.g., 9G communication circuits) only via the second end of the first spiral arm 910 and the second end of the second spiral arm 920. In this case, the conductive patch 930 is only connected to the first end of the first spiral arm 910 and the first end of the second spiral arm 920.

In FIG. 9A, the first spiral arm 910 and the second spiral arm 920 can both be logarithmic spirals, and they can also be described by using corresponding polar coordinate equations.

In this embodiment, the polar coordinate equation of the first spiral arm 910 can be characterized as $r_5(\theta)=ae^{b\theta}$, and the polar coordinate equation of the second spiral arm 920 can be characterized as $r_6(\theta)=ae^{b(\theta+\Delta)}$, wherein a and b are constants, and $\Delta$ is used to characterize the angle difference between the first spiral arm 910 and the second spiral arm 920, where a, b, $\theta$, and $\Delta$ are all real numbers. In the scenario of FIG. 9A, the angle difference between the first spiral arm 910 and the second spiral arm 920 can be understood as 180 degrees, but in other embodiments, the angle difference between the first spiral arm 910 and the second spiral arm 920 can be adjusted to other values according to the needs of the designer.

Figure 9B:
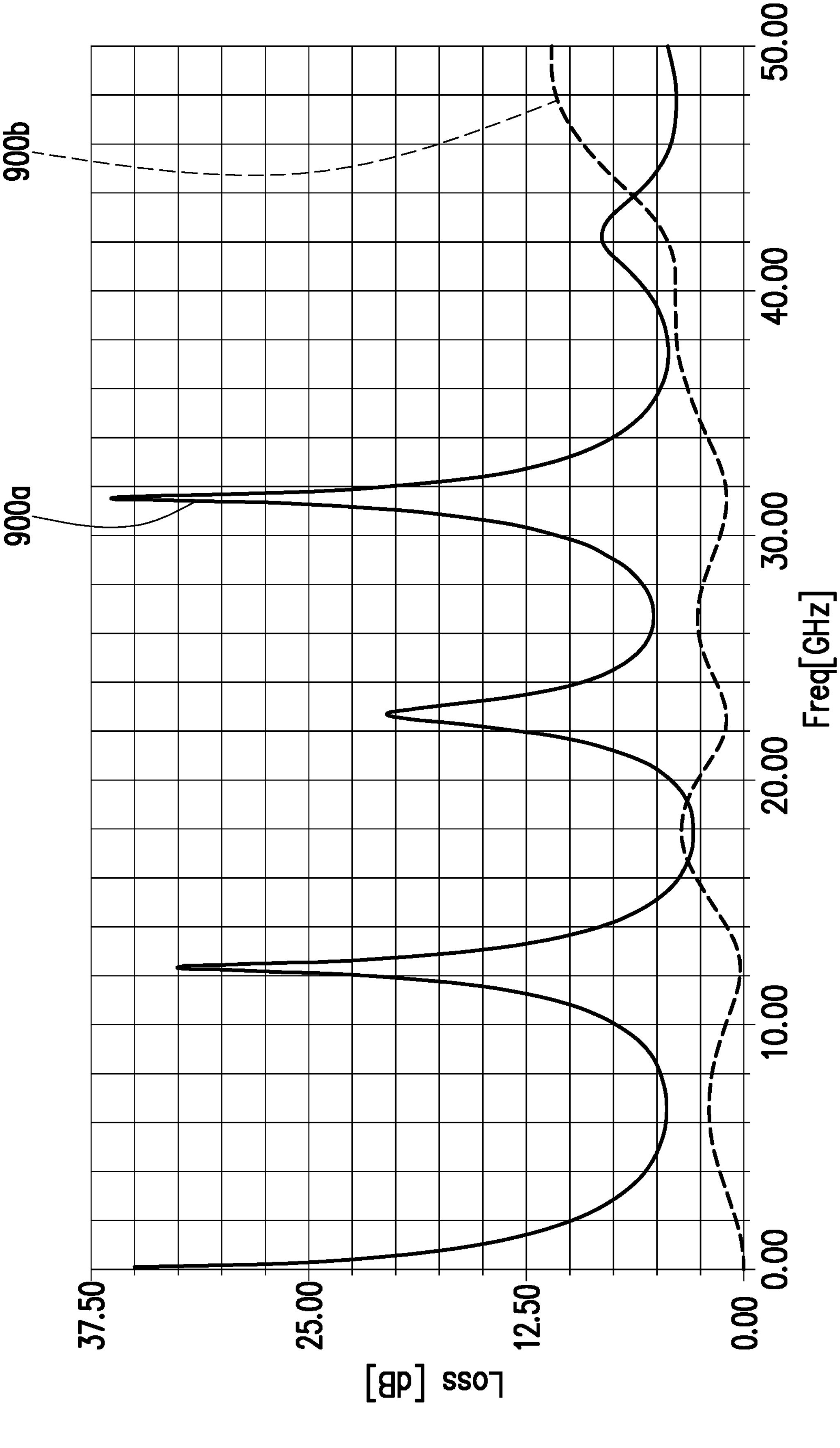
FIG. 9B is a graph of return loss and insertion loss of the coplanar inductor shown in FIG. 8A.

Please refer to FIG. 9B, which is a graph of return loss and insertion loss of the coplanar inductor shown in FIG. 9A. In FIG. 9B, curves 900*a* and 900*b* may be the return loss graph and the insertion loss graph of the coplanar inductor 900, respectively. Since the frequency bands where the insertion loss is below 3 dB are in the operable range, it can be seen that the coplanar inductor 900 of the disclosure can have a larger bandwidth. In addition, the disclosure can also correspondingly adjust the bandwidth according to the requirements of the matched circuit structure, so as to achieve the purpose of integration with the circuit structure.

In summary, the coplanar inductor of the disclosure may include first and second spiral arms that are in coplanar and a conductive patch. The first end of the first spiral arm can be coupled to the first end of the second spiral arm through the conductive patch. In this way, the size of the coplanar inductor can be reduced while maintaining miniaturization and broadband response characteristics. In addition, the coplanar inductor of the disclosure can be easily combined with other circuit architectures without additional matching circuits, and the bandwidth can be adjusted accordingly according to the requirements of the matched circuit architecture, so as to achieve integration for use with this circuit architecture.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A coplanar inductor, comprising:

a conductive patch;

a first spiral arm having a first end connected to the conductive patch and a second end, wherein the first spiral arm spirally extends from the first end of the first spiral arm toward the second end of the first spiral arm from the inside to the outside; and a second spiral arm having a first end connected to the conductive patch and a second end, wherein the second spiral arm extends spirally from the first end of the second spiral arm toward the second end of the second spiral arm from the inside to the outside, wherein the first spiral arm, the conductive patch, and the second spiral arm are coplanar, and the coplanar inductor is physically connected to at least one external circuit only via the second end of the first spiral arm and the second end of the second spiral arm, wherein the conductive patch is a round patch, a radius of the conductive patch is equal to a line width of each of the first spiral arm and the second spiral arm, wherein the round patch only connects with the first spiral arm and the second spiral arm.

2. The coplanar inductor according to claim 1, wherein one of the second end of the first spiral arm and the second end of the second spiral arm is an input end of the coplanar inductor, and the other of the second end of the first spiral arm and the second end of the second spiral arm is an output end of the coplanar inductor.

3. The coplanar inductor according to claim 1, wherein the first spiral arm comprises a plurality of line segments connected in series, and an included angle is formed between the adjacent line segments of the line segments.

4. The coplanar inductor according to claim 3, wherein the included angle is greater than 90 degrees and less than 180 degrees.

5. The coplanar inductor according to claim 1, wherein the first spiral arm and the second spiral arm are respectively an Archimedes spiral, and a polar coordinate equation of the first spiral arm is characterized as $r_1(\theta)=a+b\theta$, a polar coordinate equation of the second spiral arm is characterized as $r_2(\theta+\Delta)=a+b(\theta+\Delta)$, wherein a and b are constants, and A is used to characterize an angle difference between the first spiral arm and the second spiral arm.

6. The coplanar inductor according to claim 5, wherein the angle difference between the first spiral arm and the second spiral arm is between 90 degrees and 270 degrees.

7. The coplanar inductor according to claim 1, wherein the first spiral arm and the second spiral arm are respectively a Fermat's spiral, and a polar coordinate equation of the first spiral arm is characterized as $r_3^2(\theta)=a^2\theta$, a polar coordinate equation of the second spiral arm is characterized as $r_4^2(\theta)=a^2(\theta+\Delta)$, wherein a and b are constants, and A is used to characterize an angle difference between the first spiral arm and the second spiral arm.

8. The coplanar inductor according to claim 1, wherein the first spiral arm and the second spiral arm are respectively a logarithmic spiral, and a polar coordinate equation of the first spiral arm is characterized as $r_5(\theta)=ae^{b\theta}$, and a polar coordinate equation of the second spiral arm is characterized as $r_6(\theta)=ae^{b(\theta+\Delta)}$, wherein a and b are constants, and A is used to characterize an angle difference between the first spiral arm and the second spiral arm.

9. The coplanar inductor according to claim 1, wherein the conductive patch is only connected to the first end of the first spiral arm and the first end of the second spiral arm.

* * * * *